United States Patent
Senetar et al.

(10) Patent No.: US 6,342,197 B1
(45) Date of Patent: Jan. 29, 2002

(54) MULTI-STAGE COMBUSTION FOR FUEL PROCESSING FOR USE WITH FUEL CELL

(75) Inventors: John J. Senetar, Naperville; Gavin P. Towler, Barrington; John R. Harness, Elgin, all of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/538,424

(22) Filed: Mar. 29, 2000

(51) Int. Cl.$^7$ ................................................. C01B 3/26
(52) U.S. Cl. ..................... 423/652; 252/373; 422/111; 422/189; 422/197; 422/200; 422/211
(58) Field of Search .................... 423/650, 651, 423/652; 252/373; 422/110, 111, 189, 197, 198, 211, 200

(56) References Cited

U.S. PATENT DOCUMENTS

| | | | |
|---|---|---|---|
| 4,681,701 A | * 7/1987 | Sie | 252/373 |
| 4,691,071 A | 9/1987 | Bricker | 585/319 |
| 4,746,329 A | 5/1988 | Christner et al. | 48/61 |
| 4,861,348 A | 8/1989 | Koyama et al. | 48/94 |
| 4,925,456 A | 5/1990 | Egglestone | 48/127.9 |
| 5,110,559 A | 5/1992 | Kondo et al. | 422/109 |
| 5,181,937 A | 1/1993 | Karafian et al. | 48/95 |
| 5,609,834 A | 3/1997 | Hamada et al. | 422/196 |
| 5,776,421 A | 7/1998 | Matsumura et al. | 422/197 |

OTHER PUBLICATIONS

Article "New Hydrocarbon Proton Exchange Membranes Based on Sulfonated Styrene–Ethylene/Butylene–Styrene Triblock Copolymers" by G.E. Wnek, J.N. Rider, J.M. Serpico, A.G. Einset, S.G. Ehrenberg, L.A. Raboin, presented in the Electrochemical Society Proceedings (1995), vol. 95–23, pp. 247–251.

* cited by examiner

Primary Examiner—Steven P. Griffin
Assistant Examiner—Maribel Medina
(74) Attorney, Agent, or Firm—John G. Tolomei; Frank S. Molinaro (57) ABSTRACT

The present invention relates to an improvement of integrated fuel processor and fuel cell systems which improves stability of operation, simplifies control, and improves the heat recovery. According to the invention, a reforming zone is heated by indirect heat exchange with a first combustion effluent stream and provides a cooled first combustion effluent stream. The cooled combustion effluent stream is reheated in at least an additional combustion zone with at least a portion of the anode waste gas from the fuel cell to provide a reheated combustion effluent stream. The reheated combustion effluent stream is employed to further heat the reforming zone.

22 Claims, 3 Drawing Sheets

MULTI-STAGE COMBUSTION FOR FUEL PROCESSING FOR USE WITH FUEL CELL

FIELD OF THE INVENTION

The invention relates to a process for recovering heat from the combustion of anode waste gas produced in fuel cells. More specifically, the invention relates to a process for the multi-stage combustion of anode waste gas in fuel processors to supply heat to a fuel processor for converting a combustible fuel such as methane into a hydrogen-rich fuel for use in a fuel cell.

BACKGROUND OF THE INVENTION

The operation of fuel cell power generators for stationary and mobile use comprises a fuel processor and a fuel cell which are integrated to efficiently convert a hydrocarbon or alcohol feedstock into a hydrogen-rich fuel. Typically, the conversion of the feedstock occurs in a fuel processor wherein either a reforming reaction or a partial oxidation reaction takes place in the presence of steam to produce hydrogen and carbon oxides. The reforming process, often called steam reforming, is an endothermic chemical reaction which requires a significant amount of heat to drive the reforming reaction toward the production of hydrogen. The partial oxidation reaction is an exothermic reaction which requires the removal of heat for the equilibrium reaction to favor the production of the hydrogen-rich fuel for the fuel cell. Often a fuel processor will employ some combination of the steam reforming reaction and the partial oxidation reaction to provide heat to the steam reforming reaction from the heat released in the partial oxidation reaction. The partial oxidation reaction is typically carried out in the presence of an oxygen-containing gas and an oxidation catalyst selective for the production of hydrogen and carbon oxides.

Fuel cells are chemical power sources in which electrical power is generated in a chemical reaction. The most common fuel cell is based on the chemical reaction between a reducing agent such as hydrogen and an oxidizing agent such as oxygen. The consumption of these agents is proportional to the power load. Because hydrogen is difficult to store and distribute and because hydrogen has a low volumetric energy density compared to fuels such as gasoline, hydrogen for use in fuel cells will have to be produced at a point near the fuel cell, rather than be produced in a centralized refining facility and distributed like gasoline. Polymers with high protonic conductivities are useful as proton exchange membranes in fuel cells. Among the earliest proton exchange membranes were sulfonated, crosslinked polystyrenes. More recently sulfonated fluorocarbon polymers have been considered. Such proton exchange membranes are described in an article entitled, "New Hydrocarbon Proton Exchange Membranes Based on Sulfonated Styrene-Ethylene/ Butylene-Styrene Triblock Copolymers", by G. E. Wnek, J. N. Rider, J. M. Serpico, A. Einset, S. G. Ehrenberg, and L. Raboin presented in the Electrochemical Society Proceedings (1995), Volume 95–23, pages 247 to 251.

The fuel cell operation comprises passing the hydrogen-rich feed stream from the fuel processor to the anode side of the fuel cell and simultaneously contacting the cathode side of the fuel cell with an oxygen-containing stream, typically air, for the production of electricity within the fuel cell. An anode waste gas comprising hydrogen and a cathode waste gas comprising oxygen are also produced as by-products by the fuel cell during the electricity generation process. The anode gas has fuel value and is typically returned to the fuel cell processor for further hydrogen enrichment or for combustion to generate heat for the reforming process. The efficient operation of a fuel cell system requires the balance of the overall energy demands of the fuel processor. The cathode waste gas is generally oxygen-lean and is often employed to moderate combustion.

In a fuel cell system, the operation of the fuel cell is dependent upon the external demand for electric power. When the demand for power is high, the fuel processor must supply hydrogen-rich fuel to the fuel cell. The fuel cell, in turn, produces the anode waste gas which in the most basic scheme is burned to provide heat for the fuel processor. As the electric power demand on the fuel cell varies, variations in the hydrogen content, and hence the heating value of the anode waste gas occur. The response of the fuel cell is relatively rapid to a reduction in the supply of the hydrogen-rich fuel. However, the fuel processor does not respond as quickly to variations in electric power demand. A variation in the heating value of the anode waste gas can reduce the efficiency of the fuel processor and significantly increase the overall energy cost of producing the electricity from the fuel cell. In addition, the variation in electric power demand results in large temperature swings within the fuel processor which can create thermal stress on heat exchange equipment and lead to premature failure or fire.

In an attempt to solve the two-sided problem of varying anode gas quality and the need to recover the energy of the anode waste gas, others have employed special combustion zones. These combustion zones operate in intimate thermal contact with the fuel processor to provide heat to the reforming reaction zone. One such approach uses a single-stage combustion zone. In a single-stage combustion zone, the temperature of the combustion gases leaving the combustion zone is controlled by the rate of air, or the amount of excess air, which is introduced to the combustion zone as the fuel is burned. The combustion gases withdrawn from the combustion zone are generally passed to the fuel processor to provide heat to the reforming zone. The temperature of the combustion gases, or combustion zone effluent, establishes the level of conversion in the reforming zone, and also establishes the type of metallurgy in the heat transfer zone between the hot combustion gases and the reforming zone. In many fuel cell/processor systems using simple, single-stage combustion zones, the combustion zone comprises a single burner which is surrounded by an annular reforming zone to obtain the maximum amount of energy from the combustion process. Examples of such arrangements may be found in U.S. Pat. No. 5,110,559, U.S. Pat. No. 4,925,456, U.S. Pat. No. 5,181,937, and U.S. Pat. No. 4,861,348. Exotic metallurgy is employed in the combustion zone where heat transfer takes place at temperatures above 800° C.

U.S. Pat. No. 5,609,834 attempts to minimize the amount of excess air passed to the combustion zone by balancing and directing the heat provided to the reforming zone by means of an internal combustion zone which can adjust the magnitude and location of the combustion temperature within the combustion zone. The result is a more efficient operation wherein more useful heat is transferred to the reforming zone and the amount of excess air in the combustion zone is reduced. However, in practice, it is difficult to balance the heat input with the heat exchange because the location and magnitude of the peak temperature within the reforming zone varies with the plant capacity or electric power demand. Furthermore, it is difficult to direct the anode waste gas to this exact point in the combustion zone without imposing a large pressure drop in the anode waste distribution. In this scheme, the excess air stream is employed to control the flue gas temperature leaving the reformer rather than the temperature of the flue gas entering the reforming zone. A complex, advanced control scheme, along with a plurality of exotic temperature sensing elements in the combustion zone are required to identify the maximum temperature in the reforming zone and to avoid exceeding the maximum temperature to prevent damage to the reforming zone equipment. Since relatively cool air is employed to control the flue gas temperature, large thermal stresses are introduced when the air flow rate is suddenly increased to compensate for an increase in the heating value of the spent anode gas. U.S. Pat. No. 5,776,421 recognized the difficulty in controlling the resulting thermal stress and sought to reduce thermal stress by arrangement of the reforming reactor and burner internals.

Processes are sought for combusting the anode waste gas which simplify the overall process of burning the anode waste gas and improve the operation of the reforming zone. It is an objective of the present invention to improve the efficiency of the fuel processor for the conversion of hydrocarbons and oxygenate compounds such as alcohols, ketones, ethers, and the like.

It is an objective of the present invention to provide a process for the combustion of anode waste gas which moderates temperature swings in the fuel processor.

It is an objective of the present invention to minimize reforming temperatures while recovering heat from the combustion of anode waste gas.

SUMMARY OF THE INVENTION

The operation of fuel processors in conjunction with fuel cells, wherein the anode waste gas is burned to provide a portion of the heat to produce hydrogen, is subject to wide swings in temperature as a result of variations in anode waste gas heat content which varies in response to electric power demand. The present invention provides a simple solution to the problem of balancing energy demand with fluctuating anode waste gas heating value without requiring exotic materials of construction in the reforming zone to cope with high reforming temperatures and rapid temperature swings. The invention further provides a simple, direct control system for adjusting the reforming temperature which is based on the rate of air supplied to the combustion zone. The present invention does not require advanced control methods or exotic flame temperature measurement methods. The resulting process represents an economical and reliable integration scheme for operating a fuel processor in combination with a fuel cell for the generation of electricity.

In one embodiment, the present invention provides a process for reforming a feedstock in the presence of steam in a reforming zone in connection with a fuel cell. The process comprises passing the feedstock and steam to the reforming zone to produce a reformate stream comprising hydrogen. The reforming zone is at least partially heated by indirect heat exchange with a first combustion effluent stream to provide a cooled first combustion effluent stream. The cooled first combustion effluent stream is reheated by recombusting the cooled first combustion effluent stream with at least a portion of an anode waste gas stream withdrawn from the fuel cell to provide a second combustion effluent stream. The reforming zone is further heated by indirect heat exchange with the second combustion effluent stream.

In a further embodiment, the present invention provides a process for reforming a feedstock in the presence of steam in a reforming zone in connection with a fuel cell. The process comprises passing the feedstock comprising a hydrocarbon or an oxygenate and steam at effective reforming conditions to a reforming zone containing a steam reforming catalyst to produce a reformate stream comprising hydrogen. The reforming zone is heated by indirect heat exchange with a first combustion effluent stream to provide a cooled first combustion effluent stream. The cooled first combustion effluent stream is reheated by recombusting the cooled first combustion effluent stream with an auxiliary fuel stream to provide a second combustion effluent stream at a second combustion temperature. The reforming zone is further heated by indirect heat exchange with the second combustion effluent stream. Essentially all of an anode waste gas stream withdrawn from the fuel cell is combusted with an excess air stream to provide the first combustion effluent stream at a first combustion effluent temperature essentially equal to the second combustion temperature.

In a still further embodiment, the present invention provides a process for controlling a fuel processor used in conjunction with a fuel cell wherein said fuel processor comprising at least two combustion zones and a reforming zone, wherein a portion of an anode waste gas stream withdrawn from the fuel cell is combusted with an excess air stream at an excess air rate in a first combustion zone to provide a first combustion effluent stream at a first combustion temperature and wherein the first combustion effluent stream is cooled by indirect contact with the reforming zone to produce a cooled first combustion effluent and wherein said cooled first combustion effluent is recombusted in a second combustion zone with at least a portion of the anode waste gas stream to provide a second combustion effluent stream at a second combustion temperature, said process comprises measuring the first combustion temperature and adjusting the excess air rate to maintain a uniform first combustion temperature.

DESCRIPTION OF THE INVENTION

Generally a fuel processor to produce synthesis gas, a mixture of hydrogen and carbon oxides, comprises a feed preparation step to purify the feedstock; a combination of reforming and partial oxidation steps to convert the fuel to synthesis gas; and a series of shift converters to reduce the amount of carbon monoxide in the synthesis gas. The synthesis gas may require further removal of carbon monoxide to avoid poisoning the fuel cell. Such further reduction in carbon monoxide levels may be accomplished by preferential oxidation or separation. The present invention relates to the use of a multi-stage combustion zone with reheat to integrate the operation of the fuel processor and the fuel cell by providing an efficient method to burn the anode waste gas produced in the fuel cell to provide heat to the fuel processor. More specifically, the present invention is directed to providing a multi-stage combustion zone with reheat to more efficiently provide heat to the reforming zone of a fuel processor.

The fuel processor of the current invention uses a hydrocarbon-containing gas such as natural gas as a feedstock. The feedstock may also comprise alcohols or heavier hydrocarbons such as propane, or liquefied petroleum gas, naphtha, or diesel. Natural gas and similar hydrocarbon streams generally contain impurities such as sulfur in the form of hydrogen sulfide, mercaptans, and sulfur oxides which must be removed in a pretreatment step prior to introducing the feedstock to a steam reforming zone. The removal of sulfur from the hydrocarbon feedstock may be accomplished by any conventional means including adsorption, chemisorption, and catalytic desulfurization. In order to reduce the overall size of the hydrogen generation equipment, chemisorption with a material such as zinc oxide is preferred. The desulfurization operation will generally take place at effective conditions including a desulfurization pressure of between about 100 to about 1000 kPa. Preferably, the desulfurization operation is carried out at a desulfurization pressure of between 200 and 300 kPa. Preferably, the desulfurization operation is carried out at a desulfurization temperature less than about 300° C., and more preferably, the desulfurization operation is carried out at a desulfurization temperature between about 50° and about 300° C. Preferably, the concentration of sulfur in the desulfurized feedstock will be less than about 10 ppm-mol, and more preferably, the concentration of sulfur in the desulfurized feedstock will be less than about 1 ppm-mol. The feedstock may be divided into two separate streams, the reforming feedstream and a burner fuel stream. The reforming feedstream is preferably desulfurized to provide a desulfurized feedstream. Optionally, the entire feedstock is desulfurized prior to dividing the feedstock into a desulfurized feedstream and a burner fuel stream which is also desulfurized.

Water is required by the steam reforming process for use as a reactant. In addition, the hydrogen product must be delivered to the fuel cell as a wet gas to avoid drying out proton exchange membranes in the fuel cell. The water used in the steam reforming process preferably will be deionized to remove dissolved metals including sodium, calcium, lead, copper, arsenic, and anions such as chloride ions to prevent premature deactivation of the steam reforming catalyst or other catalytic materials contained in the fuel cell, the water gas shift catalyst, or the carbon monoxide oxidation catalyst. The deionization of the water to be used in the process may be accomplished by any conventional means.

The reforming zone contains a steam reforming catalyst. Preferably, the steam reforming catalyst includes nickel with amounts of noble metal, such as cobalt, platinum, palladium, rhodium, ruthenium, iridium, and a support such as magnesia, magnesium aluminate, alumina, silica, zirconia, singly or in combination. More preferably, the steam reforming catalyst can be a single metal such as nickel or a noble metal supported on a refractory carrier such as magnesia, magnesium aluminate, alumina, silica, or zirconia, singly or in combination, promoted by an alkali metal such as potassium. Most preferably, the steam reforming catalyst comprises nickel supported on alumina and promoted by an alkali metal such as potassium. The steam reforming catalyst can be granular and is supported within the reforming zone within a compact heat exchange zone. Generally, such exchanger zones contain the reforming catalyst as a coating or deposition in a thin layer on the walls of the exchanger zone. These walls are generally formed as flat plates or plates with channels with fins on one or both sides. Fins are typically employed to extend the heat exchange area, and when fins are employed, the catalyst is coated or deposited on the finned surface of the exchanger zone. Granular catalyst also may be incorporated into the exchanger zone by disposing or packing the granular catalyst into channels formed in the plates of the heat exchange zone. The channels are formed as straight fins in a direction parallel to the flow through the reforming zone. The channels can also be formed in an offset pattern to create an irregular flow path through the reforming zone. Because the reforming catalyst can increase the pressure drop through the reforming zone, it is preferred to dispose the reforming catalyst pellets on a side of the plate heat exchanger which has no fins, while placing fins on the opposite side of the plate in the heat exchange zones through which are passed combustion gases to heat the reforming zone. The offset pattern of the fins on the combustion side and the catalyst pellets on the reforming side promote turbulent flow within the reforming zone and heat exchange zones. The fins on one side of the exchange surface provide additional strength to the plate and extend the pressure range of operation of the exchanger. Preferably, the reforming zone is operated at effective reforming conditions including a reforming temperature of between about 600° and about 950° C. and a reforming pressure of between about 100 and 350 kPa.

When a partial oxidation zone is employed, the effluent from the reforming zone is passed at effective partial oxidation conditions to a partial oxidation zone wherein the effluent stream from the reforming zone is contacted with an oxygen-containing stream, or first air stream, in the presence of a partial oxidation catalyst to produce a partial oxidation product. If the effluent stream from the reforming zone is not at effective partial oxidation conditions, such as during the startup of the fuel processor when there is insufficient fuel for the burner zone to heat the reforming zone, the reformate stream and the oxygen-containing stream are ignited to begin the partial oxidation reaction in the partial oxidation zone. The partial oxidation product comprises hydrogen, carbon monoxide, carbon dioxide, and some unconverted hydrocarbons. The partial oxidation catalyst is disposed in the partial oxidation zone as a fixed bed. Catalyst compositions suitable for use in the catalytic partial oxidation of hydrocarbons are known in the art (see U.S. Pat. No. 4,691,071 which is hereby incorporated by reference). Preferred catalysts for use in the partial oxidation zone of the present invention comprise as the catalytically active component, a metal selected from Group VIII noble metal, a Group IVA metal and a Group IA or IIA metal of the Periodic Table of the Elements composited on a metal oxide support, wherein the support comprises a cerium-containing alumina. The alumina can be alpha-alumina or a mixture of alpha-alumina and theta-alumina. Preferably, the cerium is present in the alumina in an amount of about 0.01 to about 5.0 percent by weight of the alumina support. Preferably, the Group VIII noble metal in the partial oxidation catalyst is a noble metal selected from the group consisting of platinum, palladium, and rhodium. Preferably, the Group IVA metal which is present on the partial oxidation catalyst is selected from the group consisting of germanium, lead, and tin and the Group IVA metal is present in an amount of from about 0.01 to about 5 percent by weight of the partial oxidation catalyst. Preferably, the Group IA or Group IIA metal is present in the partial oxidation catalyst and is selected from the group consisting of sodium, potassium, lithium, rubidium, cesium, beryllium, magnesium, calcium, francium, radium, strontium, and barium and the Group IA or Group IIA metal is present in an amount in the range of from about 0.01 to about 10 percent by weight of the partial oxidation catalyst. The catalytically active metal may also be supported on suitable carrier materials well known in the art, including the refractory oxides, such as silica, alumina, titania, zirconia, and mixtures thereof. Preferably, the partial oxidation catalyst is granular and is supported as a fixed catalyst bed within the partial oxidation zone. In the process of the present invention, the partial oxidation zone is operated at effective partial oxidation conditions including a partial oxidation temperature of below about 1400° C. and a low partial oxidation pressure of between about 100 and about 350 kPa. More preferably, the partial oxidation temperature ranges between about 500° and about 1400° C., and most preferably, the partial oxidation temperature is between about 600° and about 1100° C.

The use of partial oxidation provides improved startup performance although it reduces the overall efficiency of the operation. Reforming on the other hand is slow to start up and operates at a much higher overall efficiency. The combination of the partial oxidation and reforming are especially useful in controlling and tolerating the fluctuations in the fuel rate as the demand for electric power varies.

The reforming effluent, or reformate, comprises about 5 to about 15 mole percent carbon monoxide. Because carbon monoxide can act as a poison to certain fuel cells, particularly proton exchange membrane fuel cells, the carbon monoxide concentration must be reduced to produce a hydrogen product gas. This is accomplished by passing the effluent from the reformer or the partial oxidation zone to a series of water gas shift reaction zones which exothermically react the carbon monoxide over a shift catalyst in the presence of an excess amount of water to produce carbon dioxide and hydrogen. Reforming effluent or partial oxidation zone effluent is reduced in temperature to an effective high-temperature shift temperature of between about 400° to about 450° C. and passed over a high-temperature shift catalyst to produce a high-temperature shift effluent. The high-temperature shift catalyst is selected from the group consisting of iron oxide, chromic oxide, and mixtures thereof. The high-temperature shift effluent is cooled to a temperature of between about 180° and about 220° C. to effective conditions for a low-temperature shift reaction. The cooled high-temperature shift effluent is passed to a low temperature shift zone and contacted with a low-temperature shift catalyst to further reduce the carbon monoxide and produce a low-temperature shift effluent. The low-temperature shift catalyst comprises cupric oxide (CuO) and zinc oxide (ZnO). Other types of low-temperature shift catalysts include copper supported on other transition metal oxides such as zirconia, zinc supported on transition metal oxides or refractory supports such as silica or alumina, supported platinum, supported rhenium, supported palladium, supported rhodium, and supported gold. The low-temperature shift reaction is a highly exothermic reaction and a portion of the heat of the low-temperature shift reaction is removed in a conventional manner by indirect heat exchange with a water stream to produce steam for combination with the feed to the reforming zone. The low-temperature shift effluent comprising less than about 0.5 mole percent carbon monoxide is passed to a preferential oxidation zone at effective oxidation conditions and contacted with an oxidation catalyst to produce a hydrogen product gas stream comprising less than about 40 ppm-mole carbon monoxide. Preferably, the hydrogen product gas stream comprises less than about 10 ppm-mole carbon monoxide, and more preferably, the hydrogen product gas stream comprises less than about 1 ppm-mole carbon monoxide. The heat of oxidation produced in the carbon oxide oxidation zone is removed in a conventional manner by cooling the carbon oxide oxidation zone in a conventional manner such as with a water jacket and a cooling water stream.

The hydrogen product gas stream comprising water at saturation and at a temperature less than about 100°C. is passed to the anode side of a fuel cell zone comprising at least one proton exchange membrane. The proton exchange membrane has an anode side and a cathode side and is equipped with electrical conductors which remove electrical energy produced by the fuel cell when an oxygen-containing stream is contacted with the cathode side of the proton exchange membrane. It is required that the proton exchange membrane be kept from drying out by maintaining the hydrogen product stream at saturation conditions. It is also critical that the proton exchange membrane be maintained at a temperature less than 100° C. The proton exchange membrane is only about 70–90 percent efficient in its use of the hydrogen product stream and as a result, the fuel cell produces an anode waste gas comprising hydrogen and a cathode waste gas comprising oxygen. The anode waste gas produced by the present invention comprises less than about 25 mole percent hydrogen (on a dry basis), and the cathode waste gas comprises less than about 15 mole percent oxygen. The anode waste gas has a net heating value of between about 500 to about 3000 kJ per standard cubic meter.

The use of anode waste gas as a fuel for the process is disclosed by U.S Pat. No. 4,746,329 when it is mixed with air and combusted to provide heat to a reforming zone. On the surface, it appears to be advantageous to use the anode waste gas in this manner because the heat of combustion of the anode waste gas can be recovered; however, more careful consideration of the overall process performance reveals several problems. The combustion of anode waste gas in the combustion zone produces less flue or exhaust gas from the burner, but the burning of the anode waste gas can produce higher flame temperatures than from burning fuel gas. When the temperature in the flame zone becomes excessive, the process equipment can be damaged. Conversely, when the electrical demand from the fuel cell surges, the concentration of hydrogen in the anode waste gas drops. This reduces the quality (net heating value) of the anode waste gas and reduces the flame temperature of the combustion zone, or burner. Variations in flame temperature and the resulting variations in the heating rate provided by the combustion zone, results in thermal cycling which can lead to equipment failure.

The multi-stage reheat combustion process of the present invention surprisingly decreases the amount of air required for the combustion of the anode waste gas stream to maintain the reforming zone at effective reforming conditions over a wide variation in the hydrogen content, or net heating value, of the anode waste gas stream. The control scheme required to operate the multi-stage reheat combustion process of the present invention does not require an advanced control system with combustion zone temperature sensors. Only one temperature sensor, monitoring the temperature of the first combustion effluent is required to adjust an excess air control valve or blower. Preferably, the first combustion zone effluent temperature will range from about 600° to about 800° C. More preferably, the first combustion zone effluent temperature will range from about 650° to about 700° C. Preferably, the first combustion zone effluent temperature will be essentially equal to the second combustion zone effluent temperature, or moderated so that wide swings in temperature differences between the first and the second combustion effluent will be avoided. Preferably, the temperature difference between the first and the second combustion effluent stream comprises less than about 200° C. More preferably, the temperature difference between the first and the second combustion effluent streams comprises less than about 100° C., and most preferably, temperature difference between the first and the second combustion effluent streams comprises less than about 50° C. Furthermore, the maximum temperature of the flue gas delivered to the fuel processor is easily measured and controlled to avoid material and safety-related issues of the prior art.

The present invention can be practiced with various combinations of combustion alternatives including: burning a mixture of anode waste gas and fuel gas in all stages of the multi-stage combustion zone; burning essentially all of the anode waste gas in either the first combustion zone or in one of the secondary combustion zones while burning the fuel gas stream in the remaining secondary combustion zones; and, distributing at least a portion of the anode waste gas to all of the combustion zones. Thus, the first combustion zone effluent can comprise effluent produced from the combustion of a fuel gas stream; from the combustion of a mixture of the fuel gas stream and a portion of the anode waste gas stream; and, from the combustion of essentially only the anode waste gas stream.

The hydrogen efficiency of the overall fuel processor/fuel cell process is defined as the lower heating value of the net hydrogen produced (i.e., hydrogen produced minus hydrogen returned in the form of anode waste gas) divided by the lower heating value of the fuel expressed as a percent, and multiplied by the hydrogen utilization of the fuel cell (i.e., the percent of the hydrogen which is converted in the fuel cell). Surprisingly, the multi-stage combustion with reheat scheme can provide more than 20 percent improvement in hydrogen efficiency over a single-stage combustion scheme for a steam reforming/fuel cell system with a 50 percent reduction in the excess air required for combustion. For a fuel processor comprising both a reforming zone and a partial oxidation zone, a two-stage combustion with reheat scheme reduces the excess air requirement by about 50 percent and provides an additional 8 percent improvement in the reforming zone heat recovery efficiency. For a scheme wherein essentially all of the anode waste gas is recycled to the reforming zone, the net hydrogen efficiency represented a 6 percent improvement over the prior art single-stage combustion zone scheme and requires only about one-half the excess air of the prior art scheme. The 50percent reduction in the requirement for excess air in the above schemes provides a similar 50 percent savings in the power consumption of the blower providing the air to the combustion zone.

A variation on the present invention can be employed when the reforming zone requires a heat input which is greater than can be provided by the combustion of the anode waste gas. This would occur when the reforming zone comprised only a reforming zone, not a combination of reforming and partial oxidation, or in a cold startup of the fuel processor. An igniter and an optional external fuel stream are provided for starting up the first combustion zone, when anode waste gas stream is not available, and for use potentially when the anode waste gas stream becomes too lean in hydrogen, or has a low net heating value, to produce the first combustion effluent at the desired first combustion temperature. The present invention provides a reduction in the excess air rate over the prior art combustion schemes, and provides for the essentially complete combustion of the anode waste gases, a rapid startup response of the fuel processor system. The present invention assures a minimal amount of thermal stress on the heat transfer equipment because both the first and the second combustion effluent temperatures are essentially constant.

DETAILED DESCRIPTION OF THE DRAWINGS

The invention will be further described with reference to the drawings.

Figure 1:
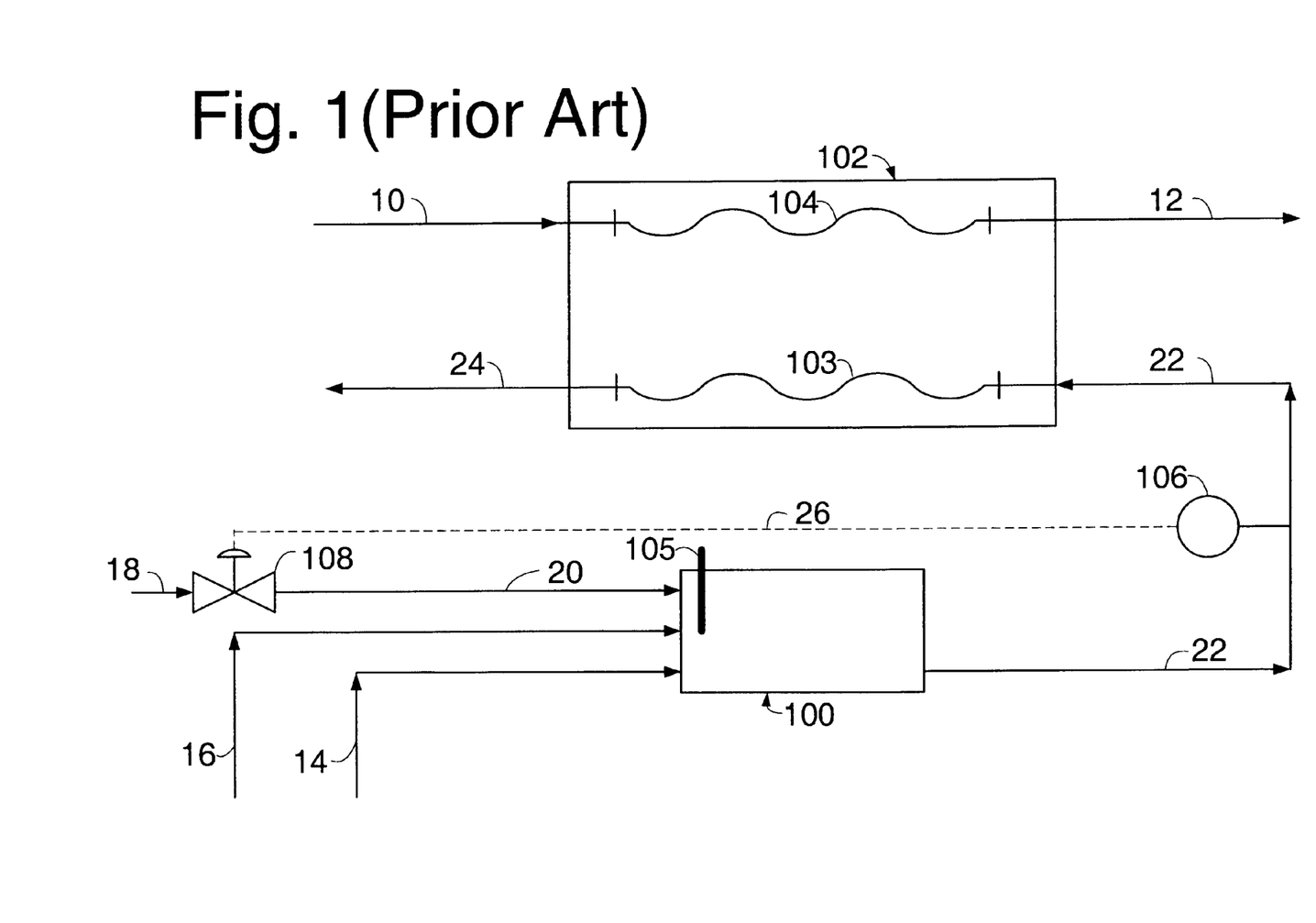
FIG. 1 is a schematic process flow diagram illustrating a single-stage combustion scheme of the prior art.

Referring to FIG. 1, a single-stage combustion prior art scheme is shown for combining a reforming zone 104 of a fuel processor zone 102 with a fuel cell (not shown) for the combustion of anode waste gas in a combustion zone 100. In this prior art scheme, an anode waste gas stream in line 14 is passed to the combustion zone 100. The combustion zone 100 has an igniter 105 and an external source of fuel such as natural gas, light hydrocarbons, or alcohols is shown as a fuel stream in line 16. The combustion zone 100 also accepts an excess air stream in line 18, which enters the combustion zone 100 via line 18, control valve 108, and line 20. Combustion of the anode waste gas stream in line 14 takes place in the combustion zone 100 in the presence of the excess air stream in line 20 in order to produce a flue gas stream in line 22. During startup of the fuel processor, it is required to introduce an external fuel stream via line 16 in the presence of an effective amount of the excess air stream in line 20 to provide the flue gas stream in line 22 at a desired flue gas temperature, measured in the flue gas temperature measurement unit 106. The flue gas stream in line 22 is passed to a flue gas heat exchange zone 103 of a fuel processor zone 102. The fuel processor zone 102 comprises a reforming zone 104 containing reforming catalyst for contacting a mixture of steam and feedstock introduced to the reforming zone 104 via line 10. The flue gas heat exchange zone 103 is in intimate thermal contact with the reforming zone 104 to heat the endothermic reaction taking place within the reforming zone 104 and to provide a cooled flue gas stream in line 24. The cooled flue gas stream in line 24 is withdrawn from the flue gas heat exchange zone 103 and released to the atmosphere. The cooled flue gas stream may also be employed to preheat the steam/feedstock mixture in line 10. Typically, the desired flue gas temperature exiting the combustion zone 100 is controlled by controlling the amount or rate of the excess air stream introduced in line 18, for example by opening or constricting valve 108. The efficiency of this scheme as measured by the energy recovered in the reformer is typically low because the single-stage combustion scheme requires a large amount of the excess air stream in order to control the flue gas temperature. Although directionally, the reforming efficiency increases as the flue gas temperature is increased, there are equipment and material limitations in the heat exchange equipment and connecting piping which limit the flue gas temperature. The external fuel gas stream in line 16 is required to offset deficiencies in the heating value of the anode waste gas stream in line 14 to compensate for variations in the hydrogen content of the anode waste gas stream in line 14 resulting from variations in electric power demand.

Figure 2:
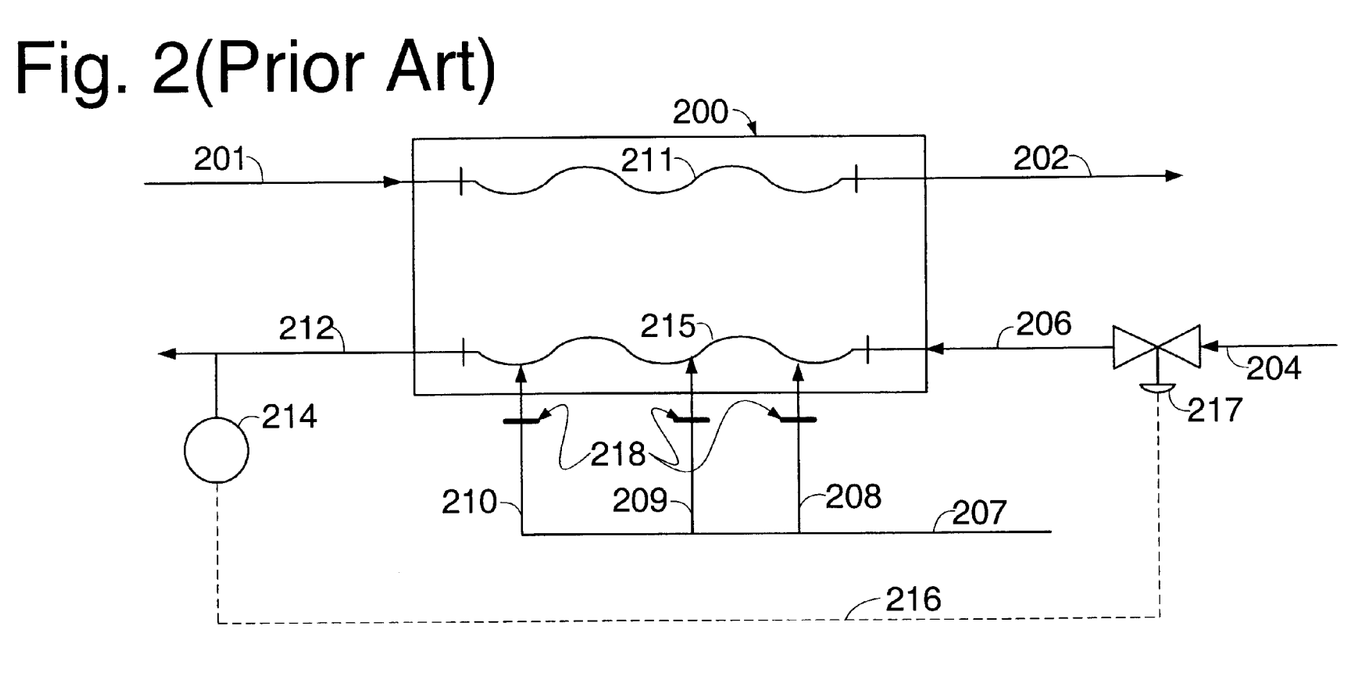
FIG. 2 is a schematic process flow diagram illustrating a prior art reformer with internal staged combustion.

Now referring to FIG. 2, a prior art representation of U.S. Pat. No. 5,609,834 with an internal combustion zone and multiple burners, a steam/feedstock mixture is passed via line 201 to a reforming zone 211 of a fuel processor zone 200. The reforming zone 211 contains a reforming catalyst and is operated at effective reforming conditions to convert the steam/feedstock mixture in line 201 to produce a reformer effluent stream in line 202. The reformer effluent stream comprises hydrogen for use in a fuel cell. Typically, the reformer effluent stream in line 202 will be further processed in a conventional manner which may include a water gas shift reaction and preferential oxidation to reduce the concentration of carbon monoxide. An air stream in line 204 is passed through an air control valve 217 and line 206 to a catalytic combustion zone 215 wherein portions of the anode waste gas stream in line 207 are distributed to the catalytic combustion zone 215 via lines 208, 209, and 210 according to distribution devices 218. The distribution devices 218 distribute the anode waste gas stream in line 207 to the appropriate portion of the catalytic combustion zone 215 to either provide heat by indirect heat transfer to the reforming zone 211 or to control the temperature within the catalytic combustion zone 215. A flue gas stream is withdrawn from the catalytic combustion zone 215 via line 212. The flue gas temperature of the flue gas stream in line 212 is measured by temperature measurement device 214 and the temperature signal is passed via signal line 216 to the air control valve 217 to adjust the amount of excess air in line 204.

Figure 3:
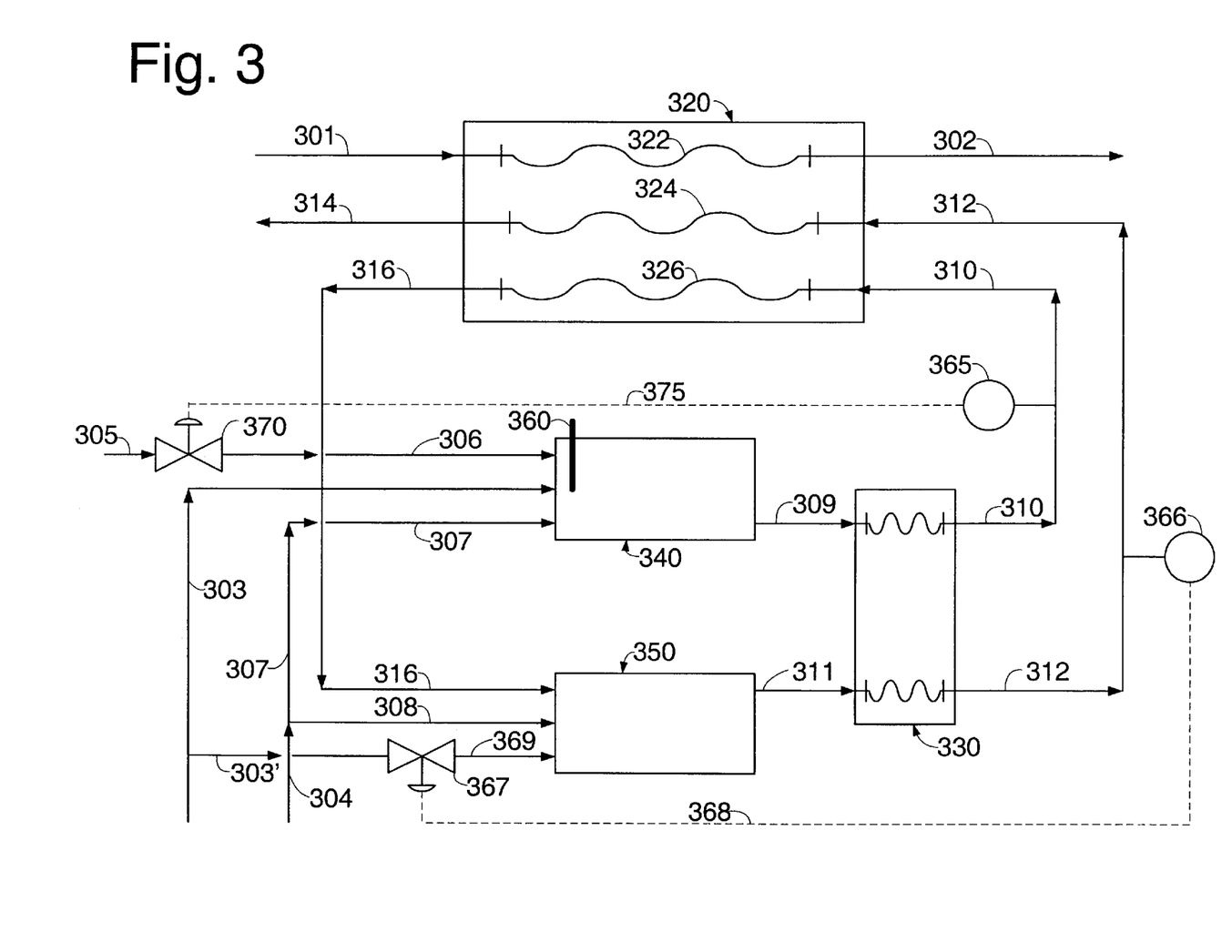
FIG. 3 is a schematic process flow diagram of the multi-stage reheat combustion scheme of the present invention.

The present invention as illustrated in FIG. 3 overcomes the limitations and inefficiencies of the prior art schemes shown in FIG. 1 and FIG. 2 by the use of multistage reheat combustion. In the present invention, the anode waste gas is divided between two or more combustion zones. Referring to FIG. 3, an air stream in line 305 is introduced to only a first combustion zone 340 of at least two combustion zones (340 and 350). Anode waste gas in line 304 is split between the two combustion zones such that a first anode waste gas stream is passed to the first combustion zone 340 via line 307 and a second anode waste gas stream is passed to the second combustion zone 350 via line 308. In the first combustion zone 340, the air stream which was passed via line 305, excess air control valve 370 and line 306 is combined with the first anode waste gas stream in line 307 and combusted to provide a first combustion effluent stream in line 309 at a first combustion temperature measured downstream of the first combustion zone 340. An igniter 360 and an optional external fuel stream in line 303 are provided for starting up the first combustion zone 340, when anode waste gas stream in line 307 is not available, and for use potentially when the anode waste gas stream in line 307 becomes too lean in hydrogen, or has a low net heating value, to produce the first combustion effluent at the desired first combustion temperature. The first combustion effluent in line 309 is passed to an optional flue gas heat exchange zone 330 which provides for indirect heat exchange between the first combustion effluent stream in line 309 and a second combustion effluent stream in line 311, withdrawn from the second combustion zone 350. The optional flue gas heat exchange zone 330 provides a passive device to smooth out any significant temperature variations between the first and second combustion effluent streams, 309 and 311. The moderated first combustion effluent stream in line 310 is passed to a first combustion gas heat exchange zone 326 in fuel processor zone 320. Fuel processor zone 320 comprises a reforming zone 322 and at least two parallel combustion gas heat exchange zones (shown herein as 326 and 324). The reforming zone contains a reforming catalyst and operates at effective reforming conditions to convert a steam/feedstock mixture in line 301 to produce a reformer effluent in line 302. The modified first combustion effluent stream in line 310 provides heat to the reforming zone 322 by indirect countercurrent heat exchange and a cooled first combustion effluent stream is withdrawn in line 316. The cooled first combustion effluent stream in line 316 is passed to the second combustion zone 350 and therein combusted with the second portion of the anode waste gas stream in line 308 to produce the second combustion effluent stream in line 311. As described hereinabove, the second combustion effluent stream in line 311 is passed to optional flue gas heat exchange zone 330 to provide a moderated second combustion effluent stream in line 312. The optional flue gas heat exchanger zone 330 provides indirect heat transfer between the first and the second combustion effluent streams by placing these streams in an apparatus which intimate thermal contact. Preferably, the first and second combustion effluent streams 309 and 311 are separately passed to the optional flue gas heat exchanger zone 330 in a cocurrent direction or a cross-flow direction relative to the direction of the flow of the first combustion effluent stream. The optional flue gas heat exchange zone provides a more stable operation of the fuel processor zone 320 by moderating temperature variations between the first and second combustion effluent streams prior to their introduction to the fuel processor zone 320. The second combustion effluent stream or the second moderated combustion effluent stream in line 312 is passed to the second combustion gas heat exchange zone 324 to provide heat to the reforming zone 322 and produce a cooled net combustion effluent stream in line 314 which is withdrawn from the fuel processor zone 320. The multi-stage reheat combustion process of the present invention surprisingly decreases the amount of the air stream required for the combustion of the anode waste gas stream to maintain the reforming zone at effective reforming conditions over a wide variation in the hydrogen content, or net heating value, of the anode waste gas stream. The control scheme required to operate the multi-stage reheat combustion process of the present invention does not require an advanced control system with combustion zone temperature sensors. Only one temperature sensor, 365, monitoring the temperature of the first combustion effluent is required to adjust the excess air control valve 370 via signal line 375. Furthermore, the maximum temperature of the flue gas delivered to the fuel processor is easily measured and controlled to avoid material and safety-related issues of the prior art.

One variation on the present invention which can be employed when the reforming zone requires a heat input which is greater than can be provided by the combustion of the anode waste gas. This would occur when the reforming zone comprised only a steam reforming zone, not a combination of steam reforming and partial oxidation, or in a cold startup of the fuel processor. In this limited scheme, essentially all of the anode waste gas is passed via line 307 to the first combustion zone 340 and the air flow in line 306 is adjusted to provide an essentially constant flue gas temperature of the first combustion effluent stream in line 309 or 310 to be exchanged with the reforming zone 322 to provide the cooled first combustion effluent stream in line 316. The cooled first combustion effluent stream in line 316 is passed to the second combustion zone 350 wherein the cooled first combustion effluent stream in line 316 is reheated by combustion of an auxiliary fuel stream (not shown) such as natural gas, propane, other hydrocarbon fuel, alcohols, other oxygenated compounds or any combination thereof. The amount of the auxiliary fuel passed to the second combustion zone is controlled to obtain a constant temperature of the second combustion effluent stream in line 312. As shown in FIG. 3, a portion of the auxiliary fuel stream in line 303 is passed via line 303', control valve 367 and line 369 to the second combustion zone 350. The second combustion zone temperature, or second combustion effluent temperature, is measured in line 312 by temperature indicator 366. A signal obtained from the temperature indicator 366 is passed to control valve 367 to adjust the auxiliary fuel gas rate to maintain a uniform second combustion effluent temperature. The control signal is passed from the temperature indicator 366 in the conventional manner either directly, or as part of an overall control scheme for the fuel processor. This alternate embodiment permits the fuel processor 320 a further reduction in the excess air rate over the prior art and provides for the essentially complete combustion of the anode waste gases, a rapid startup response of the fuel processor system. The present invention assures a minimal amount of thermal stress on the heat transfer equipment, because both the first and the second combustion effluent temperatures are essentially constant.

The following examples were prepared from engineering simulations to illustrate the operation of a fuel processor employing a combination of steam reforming and partial oxidation reactions and show the advantage of the multi-stage reheat combustion scheme of the present invention over the prior art.

EXAMPLES

Example I (Prior Art)

A fuel processor and proton exchange membrane fuel cell system employing the single-stage combustion scheme shown in FIG. 1 and described hereinabove represents a net hydrogen efficiency of about 59.6 percent as determined from the amount of hydrogen consumed in the fuel cell divided by the net heating value of the fuel passed to the fuel processor. The fuel cell capacity is 2.5 kW. The fuel processor comprises a steam reforming zone operating at about 620° C. heated by a flue gas stream at a flue gas temperature of about 670° C. The energy recovered for use in the reforming zone can be measured by the percentage of the heating value of the fuel fired in the combustion zone which is recovered in the reformer. In Example I, the net heating value of the anode waste gas is about 14,550 kJ/hr and the energy recovered in the reforming zone is 7810kJ/hr. Thus, the reforming zone heat recovery efficiency is about 53.7 percent.

Example II (Comparison to Present Invention)

The fuel processor/fuel cell system of Example I having a single-stage combustor is modified to have a two-stage combustor as shown in FIG. 3. The natural gas charge rate to the fuel processor and the hydrogen production rate are the same as Example I. The exit temperatures of the first and second combustion effluent stream is controlled to the same temperature, 670° C., as in Example I. The resulting air rate to combust the anode waste gas is about half that of Example I, reducing the power consumption of the air blower by about 48 percent over Example I. The net hydrogen efficiency of the two-stage combustor scheme of the present invention is 71.3 percent and the power output is about 3 kW. The reformer heat recovery efficiency of Example II is 65.3 percent, based on a combustion zone fuel net heating value of about 11,340 kJ/hr and about 7410 kJ/hr of energy recovered in the reforming zone. This represents about 22 percent improvement in the hydrogen efficiency of the steam reforming fuel processor fuel cell with the multi-stage stage combustion scheme of the present invention over the prior art.

Example III (Prior Art)

A fuel processor/fuel cell system of the prior art wherein the reforming zone comprises a combination of steam reforming and partial oxidation and the system employs single-stage combustion as shown in FIG. 1 represents net hydrogen efficiency of about 69.1 percent, and the power output of the fuel cell is just under 3 kW at 2.89kW, with an air rate of almost half that of Example II. The flue gas temperature of the combustion gases is 650° C. The fuel to the burner, or combustion zone in Example III is significantly lower than either Example I or II at about 6882 kJ/hr, and the energy transferred to the reforming zone portion of the fuel processor zone is about 4208 kJ/hr. The reformer heat recovery efficiency for Example III is 61.1 percent.

Example IV (Comparison to Present Invention)

A multi-stage (having two combustion stages) combustion zone of the present invention is substituted for the single-stage combustion step in Example III. The resulting net hydrogen efficiency is 70.4 percent, about 2 percent higher than Example III. However, the air rate for combustion of Example IV is now approximately one-half of the air rate of Example III, and the reforming zone heat recovery efficiency has increased to about 65.9 percent. This represents about an 8 percent improvement in the use of energy from the anode waste gas for the reforming zone, and a 53 percent reduction in the power to supply air to the combustion zone compared to Example III.

Example V (Prior Art)

A fuel processor based on the conversion of propane, or liquefied petroleum gas, is combined with a fuel cell for the production of about 5 kW (4.7 kW) of electrical power. Essentially all of the anode waste gas is returned to the reforming zone and an external fuel stream provides the combustion fuel. The fuel processor comprises a reforming zone operating at an inlet temperature of 620° C. which is heated by combustion gases produced in a prior art, single-stage combustion zone and a sufficient amount of excess air to maintain a combustion gas temperature of about 680° C. The fuel gas burned has a net heating value of about 15,650 kJ/hr and delivers about 10,024 kJ/hr to the reforming zone for a reforming zone heat recovery efficiency of about 64.1 percent. A single-stage combustion zone burning an external, supplemental fuel applies heat for the steam reforming zone. The net hydrogen efficiency for this scheme is about 74 percent, and the air rate is about 29.45 cubic meters per hour.

Example VI (Comparative Example)

The fuel processor/fuel cell arrangement of Example V with the essentially complete recycle of anode waste gas to the reforming zone is repeated with a two-stage combustion scheme of the present invention. The net hydrogen efficiency of the scheme with the combustion zone of the present invention is about 78.6 percent, or about a 6 percent improvement over the single-stage combustion case of Example V. The reformer heat recovery based on a fuel value of about 13,190 kJ/hr and providing about 10,044 kJ/hr to the reforming from the multi-stage reheat design of the present invention results in a 76.1 percent reforming zone heat recovery efficiency. This represents about a 19 percent improvement over the single-stage combustion scheme of Example V. The combustion air of Example VI is only 53 percent of Example V, providing about a 50 percent savings in air blower power consumption.

What is claimed is:

1. A process for reforming a feedstock in the presence of steam in a reforming zone in connection with a fuel cell, said process comprising:

a) passing the feedstock and steam to the reforming zone to produce a reformate stream comprising hydrogen;

b) at least partially heating the reforming zone by indirect heat exchange with a first combustion effluent stream to provide a cooled first combustion effluent stream;

c) reheating the cooled first combustion effluent stream by recombusting the cooled first combustion effluent stream with at least a portion of an anode waste gas stream withdrawn from the fuel cell to provide a second combustion effluent stream; and d) further heating the reforming zone by indirect heat exchange with the second combustion effluent stream.

2. The process of claim 1 wherein the first combustion effluent stream comprises combustion effluent produced from the combustion of a fuel gas stream.

3. The process of claim 1 wherein the first combustion effluent stream comprises combustion effluent produced from the combustion of a mixture of a fuel gas stream and a portion of the anode waste gas stream.

4. The process of claim 1 wherein the first combustion effluent stream comprises combustion effluent produced essentially from the combustion of the anode waste gas stream.

5. The process of claim 1 further comprising passing at least a portion of the anode waste gas stream to the reforming zone.

6. The process of claim 1 wherein the first combustion effluent stream comprises a first combustion effluent temperature ranging from about 600° to about 800° C.

7. The process of claim 6 wherein the first combustion effluent temperature comprises less than about 700° C.

8. The process of claim 4 wherein the first combustion effluent temperature is essentially equal to a second combustion effluent temperature of the second combustion effluent stream.

9. The process of claim 1 further comprising passing the first combustion effluent stream and the second combustion effluent stream to a flue gas heat exchange zone to provide indirect heat exchange between the first and the second combustion effluent streams.

10. The process of claim 1 wherein the reforming zone is disposed in a first zone of a multiple zone heat exchanger wherein the first combustion effluent stream is passed through a second zone of said multiple zone heat exchanger and the second combustion effluent stream is passed through a third zone of said multiple zone heat exchanger and wherein the first zone is in intimate thermal contact with the second and third zones of said multiple zone heat exchanger.

11. The process of claim 1 wherein the reforming zone comprises a steam reforming zone and a partial oxidation zone.

12. The process of claim 1 further comprising passing the reformate stream to an anode side of the fuel cell to generate electric power and recovering the anode waste gas stream.

13. The process of claim 1 wherein the fuel cell comprises a proton exchange membrane fuel cell.

14. The process of claim 1 further comprising separately passing the first combustion effluent stream and the second combustion effluent stream to an optional flue gas heat exchange zone to indirectly transfer heat between the first and the second combustion effluent streams prior to heating the reforming zone with the first and the second combustion effluent streams.

15. A process for reforming a feedstock in the presence of steam in a reforming zone in connection with a fuel cell, said process comprising:

a) passing the feedstock comprising a hydrocarbon or an oxygenate and steam at effective reforming conditions to a reforming zone containing a steam reforming catalyst to produce a reformate stream comprising hydrogen;

b) heating the reforming zone by indirect heat exchange with a first combustion effluent stream to provide a cooled first combustion effluent stream;

c) reheating the cooled first combustion effluent stream by recombusting the cooled first combustion effluent stream with an auxiliary fuel stream to provide a second combustion effluent stream at a second combustion temperature;

d) further heating the reforming zone by indirect heat exchange with the second combustion effluent stream; and e) combusting essentially all of an anode waste gas stream withdrawn from the fuel cell with an excess air stream to provide the first combustion effluent stream at a first combustion effluent temperature essentially equal to the second combustion temperature.

16. The process of claim 15 wherein the reforming zone is disposed in a fuel processor zone comprising a plurality of flat plates separating the reforming zone from a first heat exchange zone through which said first combustion effluent stream is passed and a second heat exchange zone through which said second combustion effluent stream is passed, said first and second combustion effluent streams being passed in parallel and countercurrent to the passing of the feedstock through said reforming zone.

17. The process of claim 16 wherein said reforming zone comprises granules disposed on one side of said flat plates and said first and second heat exchange zones comprise fins.

18. The process of claim 16 wherein said fins extend linearly along said flat plates in a direction parallel to the passing of said feedstock.

19. The process of claim 16 wherein said fins are offset to provide a turbulent region within the first and second heat exchange zones.

20. The process of claim 17 wherein said reforming zone comprises fins extending linearly along said flat plates in a direction parallel to the passing of said feedstock.

21. A process for controlling a fuel processor used in conjunction with a fuel cell wherein said fuel processor comprising at least two combustion zones and a reforming zone, wherein a portion of an anode waste gas stream withdrawn from the fuel cell is combusted with an excess air stream at an excess air rate in a first combustion zone to provide a first combustion effluent stream at a first combustion temperature and wherein the first combustion effluent stream is cooled by indirect contact with the reforming zone to produce a cooled first combustion effluent and wherein said cooled first combustion effluent is recombusted in a second combustion zone with at least a portion of the anode waste gas stream to provide a second combustion effluent stream at a second combustion temperature, said process comprises measuring the first combustion temperature and adjusting the excess air rate to maintain a uniform first combustion temperature.

22. A process for controlling a fuel processor used in conjunction with a fuel cell wherein said fuel processor comprising at least two combustion zones and a reforming zone, wherein a portion of an anode waste gas stream withdrawn from the fuel cell is combusted with an excess air stream at an excess air rate in a first combustion zone to provide a first combustion effluent stream at a first combustion temperature and wherein the first combustion effluent stream is cooled by indirect contact with the reforming zone to produce a cooled first combustion effluent and wherein said cooled first combustion effluent is recombusted in a second combustion zone with a fuel gas stream introduced at a fuel gas rate to provide a second combustion effluent stream at a second combustion temperature, said process comprises measuring the second combustion temperature and adjusting the fuel gas rate to maintain a uniform second combustion temperature.

* * * * *